Patented Apr. 25, 1939

2,155,942

UNITED STATES PATENT OFFICE 2,155,942

DYEING PROCESS AND COMPOSITIONS THEREFOR

Jean G. Kern, East Aurora, N. Y., assignor to National Aniline and Chemical Company, Inc., New York, N. Y., a corporation of New York No Drawing. Application January 4, 1937, Serial No. 118,992

15 Claims. (Cl. 8—45)

This invention relates to the art of dyeing and coloring and to new products useful in connection therewith.

I have found that the bis-diazo-imino compounds which are obtained by reacting aromatic diazonium salts with hexamethylene tetramine and which may be regarded as derivatives of penta-methylene-tetramine, may be used in dyeing and printing processes to yield azo colors of great fastness and brilliance in or on textiles of animal or vegetable origin. These bis-diazo-imino compounds may be represented by the following general formula:

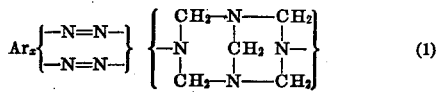

wherein Ar represents an aromatic radical and $x$ represents an integer less than 3.

The above compounds upon treatment with acid readily yield active coupling diazonium salts. Accordingly the compounds may be employed in the usual dyeing processes for the production of azo dyes. Thus the bis-diazo-imino penta-methylene-tetramine compound and a suitable coupling component may be applied to textile material by immersion, by padding, or by printing and the material partially or completely impregnated in this manner may be subjected to an acid developing treatment. Upon acidic treatment of the bis-diazo-imino-penta-methylene-tetramine compounds, coupling of the regenerated diazonium salt takes place with remarkable celerity due to the simultaneous decomposition of the hetero-bi-cyclic penta-methylene bridge into its gaseous components, formaldehyde and ammonia, thus regenerating two molecules of the active coupling diazonium salt for each diazo-imino molecule destroyed. The formaldehyde, which is liberated as a result of acid treatment, often has a desirable effect upon resultant azo dyeings inasmuch as it increases the fastness of the dyeing to washing and to light. This advantage is particularly notable in the case of dyes containing one or more free amino groups.

Because of the solubility of many of the bis-diazo-imino compounds of this invention in cellulose acetate the coloring of this material may be performed with great ease with or without the aid of dispersing agents usually necessary for uniform coloring of cellulose esters.

The diazo-imino compounds of the present application are noteworthy for their excellent stability, even under unusually severe atmospheric conditions. Accordingly they are especially suitable for distribution in climates where less stable forms of the diazo compounds, for instance the nitrosamines, are unsuitable because of their relative instability.

The diazo-imino compounds herein described are extremely stable in dry form. They are also stable in organic solvents or in neutral or alkaline aqueous media, and may be heated therein to around 100° C. without any substantial decomposition. They may be mixed with coupling components to form dye compositions of high stability. If desired, solvents, dispersing agents, protective colloids, swelling agents, etc. may be added to such dye compositions in accordance with customary practice in the preparation of azo dyeing and printing compositions. Thus neutral soaps or aliphatic partial ester salts, such as the alkali-metal alkyl sulfates, or aliphatic, aromatic, or mixed (aralkyl) sulfonates of alkali-metals or of quaternary ammonium bases may be added. Such dye compositions may be made up as dry powders or as pastes or may be diluted to form aqueous solutions and/or suspensions which may be thickened by the addition of starch tragacanth or similar materials to form printing pastes.

The rates of cleavage of the individual diazo-imino compounds by acid differ considerably. The diazo-imino compounds of the anthraquinone series are cleft more slowly by the action of acids than the analogous compounds of the benzene series. In the case of the diazo-imino compounds derived from anthraquinone it is therefore desirable to employ a nitrite in order to accelerate acid development. Although the presence of nitrite in the acid developing bath also accelerates the regeneration of the diazonium salts from diazo-imino compounds which are particularly susceptible to cleavage, the latter compounds are so readily cleft by acid alone that there is little advantage in adding to them a nitrite as a cleavage accelerator.

The diazo-imino compounds of the present invention are in general insoluble in water. However, compounds which contain groups inducing solubility in water, i. e. sulfo, carboxyl or in some cases hydroxyl groups, may be dissolved in hot alkaline solution without difficulty. The compounds in general are soluble in organic solvents, particularly so in ethylene bromide, toluene, or monoethyl ether of ethylene glycol, etc.

The solutions or dispersions of the compounds of the present invention show a marked affinity for a great variety of textiles, for example natural silk, weighted or not, wool, cotton, rayon, cellulose esters, and cellulose ethers; consequently the said solutions and dispersions may be readily applied to all manner of textiles by the usual bath, padding, or printing processes.

The diazo-imino compounds of the present invention may be prepared by the action of diazonium salts upon hexamethylene-tetramine. By mixing an aqueous solution of two mols of an aromatic diazonium salt with one mol of hexamethylene-tetramine, the reaction product is obtained; formaldehyde and the acid corresponding to the diazonium salt are evolved. Normally the diazo-imino compounds, being insoluble in water, separate as precipitates. When the compounds possess groups conferring solubility in water, they may be recovered from these aqueous solutions by crystallization. In order to avoid decomposition of the product formed, it is desirable to neutralize promptly the acid formed by the reaction or to filter the precipitated product and wash it free from any acid without delay. Reaction conditions may, of course, be varied by addition of buffers, neutralizing agents, etc. The reaction when, for example, a diazonium chloride is used appears to be as follows:

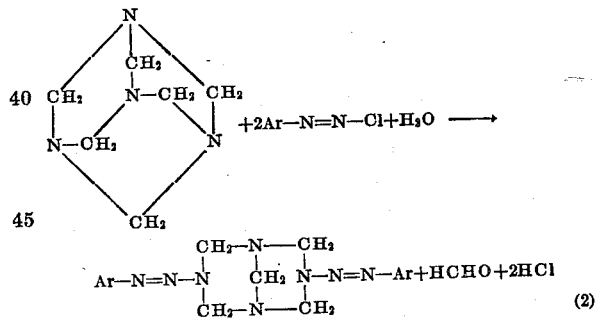

In the case of tetrazonium salts, the two diazo groups may be united with a single penta-methylene-tetramine ring forming a cyclic compound in which event the two aromatic groups represented by Ar in the above formula are replaced by an aromatic group which is attached to both diazo groups and is derived from the tetrazonium salt.

I have found that the diazo-imino compounds of the penta-methylene-tetramine type may be prepared from any of the diazonium salts employed in the art of dyeing. Thus the aromatic diazonium salt may comprise any mono- or polynuclear aromatic radical which may consist of separate or condensed aromatic nuclei, substituted or unsubstituted, e. g. the aromatic nucleus may be that of benzene, naphthalene, anthracene, diphenyl, anthraquinone, dianthraquinonyl, anthraquinone-alpha or beta-quinoline, naphthanthraquinone, benzanthraquinone, benzanthrone, or carbazole, etc., and the nucleus may be substituted by one or more substituents, for example by one or more of the following elements or radicals: alkyl, aryl, aralkyl, alkoxy, aryloxy, aralkoxy, acyl, hydroxyl, mercapto, carboxyl, halogen, sulfo, sulfonyl, sulfino, sulfitic, methylene-sulfitic, nitro, amino, substituted amino (for instance alkyl-, aryl-, acyl-, or sulfamino), azo, diazo, or azoxy.

Those products of this invention which are free from sulfonic acid groups, and particularly those free from carboxyl groups as well, are to be preferred in the production of fast dyeings resistant to washing. The presence of the aforesaid solubilizing groups tends to increase the affinity of the dyes for fibers such as cotton, natural silk, wool, etc., but on the other hand, they cause the dyes to be more soluble in water. The usual coupling components employed in the dyeing art may be used with the diazo-imino compounds, for instance beta-naphthol, 2,3-hydroxy-naphthoic acid or the arylides thereof, salicylic acid arylides, methylphenyl pyrazolones, 2-hydroxy-carbazole - 3 - carboxylic acid arylides, 2,4-dihydroxy-quinolines, acidyl acetic esters, acidyl acetic amides or other beta-keto-acidyl-compounds, etc.

For the production of azo prints, compositions containing both the diazo-imino compound and a coupling component may be applied by means of a printing press or stencil and the printed fabric may then be subjected to an acid treatment to develop the azo print.

Azo dyeings also may be produced by first applying a suitable solution or paste of the diazo-imino compound to the material, then hydrolyzing the compound with acid to liberate the diazonium salt in and upon the material and finally developing the dye in situ by applying a suitable coupling component to the treated material. This is the preferred method of operation when cellulose acetate, propionate, or other cellulose ester or ether is to be dyed.

The diazo-imino compounds of the general formula:

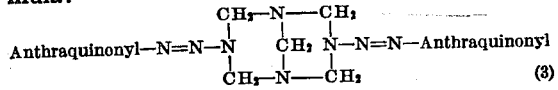

wherein the anthraquinonyl radicals may be substituted or unsubstituted, have been found to be especially valuable for the dyeing of cellulose esters and ethers, e. g. the acetate silks. The said anthraquinonyl derivatives are among the relatively stable bis-diazo-imino compounds of the present invention. Although, in many cases, the cleavage of such anthraquinonyl diazo-imino compounds may be effected by means of strong mineral acid, for example hydrochloric acid, with the aid of heat, this procedure has a tendency to affect cellulose acetate filaments and fabrics adversely and to cause a relatively poor finish as compared with that obtainable by accelerated cleavage with nitrite; hence the use of nitrite with with such compounds is preferred.

The diazo-imino compounds of this invention containing anthraquinonyl nuclei attached to the diazo groups possess particularly high tinctorial power themselves,—i. e. prior to cleavage and coupling.

The above advantageous properties of the anthraquinone compounds also are possessed by their corresponding enols and by their esterified or etherified leuco compounds, e. g. their leuco sulfuric acid esters, leuco benzyl ethers, etc.

Anthraquinone diazo-imino compounds, wherein the diazo group is separated from the anthraquinonyl radical by an arylamino or alkylarylamino radical which is not an anthraquinonyl radical, are of intermediate stability: they are somewhat more stable than the simple aryl—say phenyl—diazo-imino compounds but less stable than the directly linked anthraquinonyl-diazo-imino compounds.

Compounds of the above extra-nuclear diazo-imino type, which contain an additional amino group directly linked to the anthraquinonyl radical, may be readily prepared since the "external" amino group of an amino-arylamino-anthraquinonyl amine (i. e. the amino group not attached to the anthraquinone nucleus) can be diazotized in a weakly acidic nitrite solution, for example an acetic acid solution, while the amino group which is attached directly to the anthraquinone nucleus remains unaffected during this diazotization. When such diazo-imino compounds are subjected to cleavage in strong acid in the presence of nitrite the amino group directly linked to the anthraquinone residue is diazotized also so that in the presence of a coupling component the diazo-imino compounds which contain an amino anthraquinonyl radical may be made to yield disazo dyes.

The diazo-imino pentamethylene-tetramine compounds as above indicated may be prepared from diazotizable amines in general; specific examples of such amines are the following:

1-amino-benzene-4-sulfonic acid,
4'-dimethylamino-4-amino-azobenzene,
4-amino-azobenzene,
Meta-chlor-aniline,
2,5-dichlor-aniline,
3-nitro-4-amino-toluene,
3-nitro-4-methoxy-aniline,
3-nitro-6-methoxy-aniline,
3-chlor-6-methoxy-aniline,
2-amino-5-nitro-toluene,
1,4-dimethoxy-5-benzoylamino-aniline,
2,5-diethoxy-4-benzoylamino-aniline,
2-methyl-4-chlor-aniline,
2-methyl-5-chlor-aniline,
2-amino-4,5-dichlor-toluene,
3-methoxy-4-benzoylamino-6-chlor-aniline,
2,5-dichlor-4-amino-toluene,
2-amino-5-nitro-toluene,
4-nitro-6-methoxy-aniline,
2-methoxy-5-ethoxy-4-benzoylamino-aniline,
2,5-dimethoxy-4-benzoylamino-aniline,
4-nitro-4'-amino-2',5'-dimethoxy-azobenzene,
4-chlor-4'-amino-2',5'-diethoxy-azobenzene, of the directly linked anthraquinonyl type:

Alpha-amino-anthraquinone,
Beta-amino-anthraquinone,
1,4-diamino-anthraquinone,
1-amino-4-hydroxy-anthraquinone,
1-amino-5-chlor-anthraquinone,
1-amino-4-chlor-anthraquinone,
2,6-diamino-anthraquinone,
1-amino-2-methyl-anthraquinone,
1-phenoxy-5-amino-anthraquinone,
1-ethylamino-4-amino-anthraquinone,
1-amino-anthraquinone-4-thiosalicylic acid,
1,5-diamino-anthraquinone,
1,5-diamino-2-methyl-anthraquinone,
1,8-diamino-anthraquinone,
1,8-diamino-2-methyl-anthraquinone,
1-amino-2-brom-4-hydroxy-anthraquinone,
5,5'-diamino-alpha, alpha'-dianthraquinonyl,
1,4-diamino-2,3-dichlor-anthraquinone,
1-amino-2,4-dichlor-anthraquinone,
1-amino-anthraquinone-2-carboxylic acid,
1-amino-anthraquinone-5-sulfonic acid,
1-amino-anthraquinone-8-sulfonic acid,
Amino-benzanthrone,
2,6-diamino-benzanthrone,
1-amino-4-para-tolylamino-anthranquinone,
1-amino-4-phenylamino-anthraquinone,
1-amino-4-phenylamino-5-hydroxy - anthraquinone,
1,5-diamino-4-phenylamino-anthraquinone,
1-amino-4-para-tolylamino-5-hydroxy - anthraquinone,
4'-amino-anthraquinone-1,2-quinoline,
4'-amino-anthraquinone-2,1-quinoline, etc., and of the extra-nuclear amino anthraquinones:

1,5-di(para - amino - phenylamino) - anthraquinone,
1-(para-amino-phenylamino)-anthraquinone,
1-amino-5-(para-amino-phenylamino) - anthraquinone,
1-amino-4-(para-amino-phenylamino) - anthraquinone,
1-hydroxy-4-(para - amino - phenylamino) - anthraquinone,
1-methylamino-4 - (para-amino - phenylamino) - anthraquinone,
1-dimethylamino-4-(para-amino-phenylamino)-anthraquinone,
1-ethanolamino-4-(para - amino-phenylamino)-anthraquinone.

*Example 1.*—17.3 parts sulfanilic acid ($\frac{1}{10}$ mol.) are dissolved in 4 parts NaOH ($\frac{1}{10}$ mol.) and 70 parts water. After solution is complete 200 parts ice and 10 parts sulfuric acid (98%) are added, and the sulfanilic acid is diazotized with 7 parts sodium nitrite dissolved in 50 parts of water. At the end of the reaction the diazo solution should be neutral to Congo red paper. Then about 8 parts hexamethylene tetramine (which is 1 part in excess of the equivalent amount) are added slowly. The mixture is continuously stirred and the temperature is kept between 5° and 10° C. for several hours during which time a slow reaction takes place with the formation of a colorless crystalline product whose probable formula is:

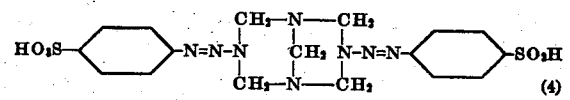

(4)

It is converted into its sodium salt by the addition of approximately 11 parts sodium carbonate. It is best to let the solution stand overnight in order to get complete coupling.

The mother liquor with contained crystals is then heated to 80° C., whereby the sodium salt goes into solution. "Norite", or some other variety of activated charcoal may be added for the purpose of purification. The hot solution is filtered, and a small amount of common salt is added to the filtrate which is then allowed to cool. The product precipitates from the cooled solution in a very pure and crystalline form, which may be separated as a cake by filtration and dried at low temperature, say between 50° C. and 60° C., preferably in vacuo.

This product possesses direct affinity for textile fibers, particularly for wool and for natural and weighted silk. It is applied to a fibrous material by any known dyeing method and the said material, which is not colored at this stage, is treated with a dilute solution of hydrochloric acid (approximately 1% on the weight of the dyed goods e. g. one pound of muriatic acid 20° Bé. for each 100 pounds of goods) or of any suitable mineral and/or organic acid, at a temperature of 15° to 20° C., whereby the bis-diazo-imino compound is converted into its corresponding diazo-benzene-sulfonic acid which ultimately is made to couple with any suitable coupling component, to produce directly on the fabric a coloring matter of increased fastness to washing.

If an organic acid is used in the acidification step, the amount of acid in the hydrolyzing bath may be increased, for example, from 2% to 5% for formic acid, or 5% to 7% for acetic acid based on the weight of the material to be dyed, the higher amounts of acid being used with baths at about 15° C., and the lesser amounts with baths of increased temperature, but the amount of acid added is in no way limited, since a hydrolyzing medium with the slightest acid reaction causes cleavage.

The cleavage operation is very much hastened by the addition of a nitrite, i. e., sodium nitrite to the acid hydrolyzing bath.

By the proper selection of coupling components very fast dyeing may be produced.

Thus the following coupling components produce fast shades as illustrated below:

Diphenylamine _____ Yellow
O-aniline-sulfonic acid _____ Yellow
Salicylic acid _____ Yellow
Beta-naphthol _____ Orange
Beta-hydroxy-naphthoic acid _____ Scarlet
2,3-hydroxynaphthoic acid o-toluidide _____ Yellowish red

*Example 2.*—2 mols equivalents of 4'-dimethyl-amino-4-amino-azo-benzene are diazotized in the usual manner and reacted with 1 mol equivalent of hexamethylene tetramine. After neutralizing the coupling solution with sodium acetate and soda ash, the liquor is allowed to stand overnight, whereupon a very abundant yellow precipitate is deposited. The mass is filtered, the cake is washed with a little cold water, and dried at low temperature. The product has the following probable formula:

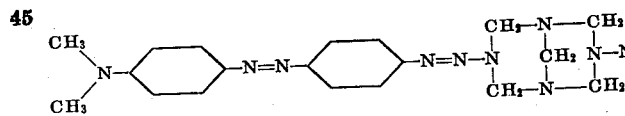

This compound is mixed in a convenient manner, as in a rotary ball mill, with a dispersing agent, e. g., a mixture is made of 10 parts of iso-butyl-phenol-sodium-sulfonate and 40 parts of the above identified compound.

A cellulose acetate skein weighing 10 grams is entered into a lukewarm bath composed of ¾ gram of the above mixture (corresponding to a dyeing with an amount of bis-diazo-imido compound equal to 6% of the weight of the skein) and 200 cc. of soft water, and is worked for one hour at rising temperature. The final temperature should not exceed 75° C. After further working for a half hour at this temperature, a yellowish-brown dyeing is obtained. The dye skein is rinsed, soaped and submitted to a hydrolyzing bath composed of 2 grams hydrochloric acid (20° Bé.) and 1 gram sodium nitrite in 200 cc. water at about 15° C. for about one hour. The dyeing is then successively rinsed, treated with a weak solution of sodium acetate, wrung out, and developed over a period of about a half hour in a bath composed of 0.4 gram beta-hydroxy-mono-sodium naphthoate dissolved in 200 cc. water.

During this developing treatment the temperature of the developing bath is gradually raised to between about 50° C. and about 60° C. A beautiful black dyeing of exceptional fastness is thus obtained.

*Example 3.*—2 gram mols of 2,5-dichlor-aniline are diazotized in the usual way by means of hydrochloric acid and sodium nitrite, and after all mineral acid has been neutralized by means of sodium acetate, the 2,5-dichlor-benzene-diazonium salt thus obtained is coupled into one gram mol of a cold solution of hexamethylene-tetramine obtained by condensing 267 cc. aqueous ammonia (density .9 and titrating 28.33% NH$_3$) with 650 cc. formaldehyde solution 37.3% CH$_2$O. The coupling liquor is then neutralized to slightly alkaline reaction with soda ash, whereupon a fine white precipitate of the product is obtained in substantially quantitative yield.

The precipitate is filtered off, washed several times with water, pressed and dried at low temperature. The dry product is white with a slight aromatic odor and has the following probable formula:

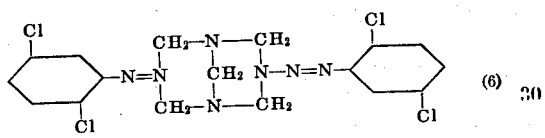

The product is very soluble in alcohol, the mono-ethyl-ether of ethylene glycol (cellosolve), toluene, ethylene bromide, etc. It may be used for the production of azo dyes by treatment thereof with an acidic reagent with or without the aid of a salt or ester of nitrous acid and coupling with any desired coupling component.

*Example 4.*—2 mols of 3-nitro-4-mino-1-methylbenzene are diazotized and neutralized as in Example 3, reacted with hexamethylene-tetramine and made alkaline whereby a compound corresponding to the following probable formula is obtained:

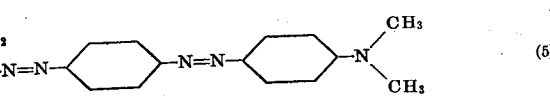

The reaction product, separated as a cake by filtration, and washed, may be thereafter dried or otherwise treated for the preparation of dye compositions. Thus 455 parts of a precipitated product (dry basis) may be mixed with 10 parts of Leukanol, i. e., a condensation product of a naphthalene sulfonic acid and formaldehyde, and 354 parts of aceto-acetic acid anilide for the preparation of a dye composition. Upon cleavage by heating at 85° to 90° C. in the presence of acetic acid the yellow dyestuff para-methyl-ortho-nitro-phenyl-azo-alpha-aceto-acetyl-anilide is formed.

*Example 5.*—60 parts of the wet filter cake obtained in the foregoing Example 3, and containing approximately 5 parts of the bis-diazo-imino compound obtained from 2,5-dichlor-aniline are worked with 5 parts Leukanol into a thin paste to which the following ingredients are added while stirring: .5 part sodium nitrite, 23 parts cellosolve, 5 parts of the sodium salt of the ortho-toluidide of 2,3 - hydroxy - naphthoic acid, and 6.5 parts water.

40 parts of the suspension so obtained are then worked into 60 parts of a neutral starch-tragacanth thickener whereby a smooth printing paste is obtained.

Any textile material, in particular cotton, is then printed with this paste by means of a printing press, the fabric is thereupon dried and the print developed by passage thereof into an aqueous bath containing 20 cc. acetic acid, 5 cc. formic acid, and 25 grams sodium sulfate per liter at a temperature of 85° C. to 90° C., whereupon a brilliant scarlet shade is developed on the material.

*Example 6.*—400 parts of an aqueous diazonium chloride solution derived from the diazotization of 33.6 parts (⅕ mol.) para-nitro-orthoanisidine are diluted with 200 parts of ice whereupon 14 parts (1/10 mol.) hexamethylene-tetramine dissolved in 75 parts of water are added.

A very fine yellow precipitate appears. After all the mineral acid has been neutralized with sodium acetate, this precipitate may be isolated by filtration, but in order to insure most complete coupling it is best to neutralize all acids to completeness with sodium bicarbonate or sodium carbonate.

The formed product, which has the following probable formula:

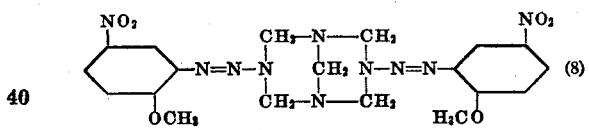

is an intense yellow substance of micro-crystalline nature. It may be separated as a cake by filtration, then washed and dried in vacuo at about 50° C. For the purpose of preparing my printing compositions, it is preferable to omit the drying, and to keep the above identified product in the form of its aqueous press cake which is further treated as follows:

50 parts of the press cake obtained according to the above example containing approximately 10.85 parts of the above identified bis-diazoimino compound are thinned down with 10 parts Leukanol, then 9.5 parts sodium isobutyl sulfate, 13.4 parts of the sodium salt of the orthotoluidide of 2,3 - hydroxy - naphthoic acid, 2.25 parts sodium nitrite, and 4 parts soluble dextrine are added. This suspension is mixed thoroughly into a uniform paste which is then dried. A composition is thus obtained which may be dispersed in any suitable thickening to make a printing paste for the printing of fabrics composed of fibers of vegetable and/or animal origin as well as fibers composed of regenerated cellulose and/or esterified cellulose and/or cellulose ethers. For instance, 20 parts of the above printing composition may be dispersed in 20 parts warm water to which 10 parts cellosolve may be added and the suspension worked into a smooth printing paste with a starch tragacanth thickener. The material is then printed, well dried, and passed through a developing bath as described in the foregoing example, whereby a very brilliant bluish scarlet of great depth is developed on the printed material.

*Example 7.*—22.3 parts alpha-amino-anthraquinone are dissolved in 220 parts concentrated sulfuric acid, the solution is cooled to between about 10° C. and about 15° C., at which temperature it is maintained while 8 parts of solid sodium nitrite are added. After about one hour's standing, the anthraquinone diazonium sulfate is formed. The sulfuric acid solution is then poured over about 800 parts chipped ice; the diazonium salt crystallizes out. The resulting suspension is filtered and the filter cake of diazonium salt is pressed as free as possible from sulfuric acid.

The cake is then redissolved in water and the solution is made neutral to Congo red paper with sodium acetate. To the cooled solution are added a solution in as little water as possible of about 8 parts hexamethylene-tetramine, that is, a slight excess over the amount corresponding to half of the molecular equivalent of the diazonium compound. A yellow precipitate is formed very shortly after the mixture is effected, indicating that the coupling reaction is taking place. The mixture is then slightly alkaline with soda ash, the neutralization causing a color change in the mixture from yellow to red with the formation of an abundant finely divided precipitate. After continuous stirring during 10 or 12 hours, the mother solution loses all ability to couple when treated with R salt. The precipitate at this stage is a very highly colored red pigment. It is separated as the cake by filtration and dried in vacuo at about 60° C. It has been identified as the di(alpha - anthraquinonyl - diazo) - pentamethylene-tetramine of the following probable constitution:

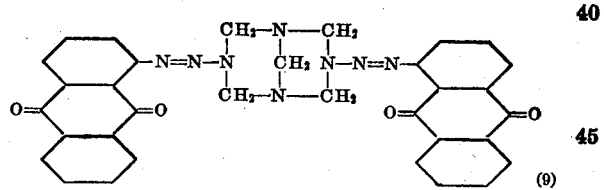

This product has a very high melting point (above 275° C.) as compared with alpha-aminoanthraquinone (M. P. 238°–240° C.) and shows a slight darkening at 275° C. When hydrolyzed in the presence of NaNO₂ it regenerates the alpha-anthraquinone-diazonium compound, formaldehyde, and ammonia, at which stage it couples very readily with any suitable coupling component. It is insoluble in water, soluble in most organic solvents, and lends itself to excellent aqueous dispersions when agitated in the presence of a dispersing agent. It is very soluble in cellulose acetate and cellulose ethers, and is an excellent dye for fibers composed thereof. In contra-distinction to most diazo-amino compounds it has a very high tinctorial power per se yielding dyeings surpassing in shade and brilliancy the amino-anthraquinone body from which it is derived. Di-(alpha-anthraquinonyl diazo)-penta-methylene-tetramine is far more reactive than its parent body, namely, alpha-amino-anthraquinone, and can be used to advantage instead of the parent body in all reactions wherein the amino group is to be substituted in itself, or replaced by another group. It may be reconverted into its diazonium body in situ under conditions which are quite unsuited for diazotizing alpha-amino-anthraquinone.

*Example 8.*—25.75 parts 1-amino-4-chlor-anthraquinone are dissolved in 250 parts concentrated sulfuric acid, the solution is cooled and poured slowly into a solution of 8 parts sodium nitrite in 30 parts water and 800 parts ice. The 4-chlor-anthraquinone-1-diazonium sulfate is thus formed very readily and separates out in crystalline form. To the mass small amounts of sodium sulfate may be added to precipitate the diazonium salt completely. The latter is separated as a cake by filtration and is freed by suction from the greater part of the mother liquor containing free sulfuric acid. The crystal cake is then treated with 250 parts of water and made neutral to Congo red with sodium acetate, whereupon a solution of 8 parts hexamethylene-tetramine in 40 parts water is added and thereafter the procedure as outlined in Example 7 above is followed.

The dark reddish-brown product has the following probable formula:

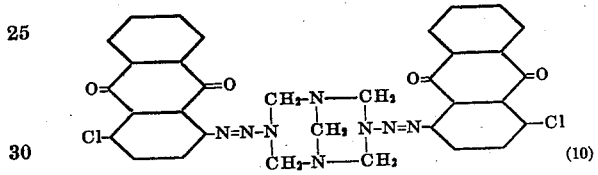

and has properties similar to the compound obtained in Example 7.

*Example 9.*—To 34.3 grams of 1-methylamino-4-(para-amino-phenylamino)-anthraquinone in the form of a finely divided suspension in 3000 cc. of cold water are added 7.2 grams sodium nitrite which, when completely dissolved, is followed by the addition of 30 grams glacial acetic acid. The mixture is stirred for 4 hours, then 8 grams hexamethylene-tetramine dissolved in 30 cc. cold water are added, after which a 10% solution of sodium carbonate is run in until the liquid reacts slightly alkaline. A yellowish-brown precipitate forms very slowly; the liquor is kept at a temperature of about 15° C. during 4 to 6 hours, after which time it has lost its coupling ability.

The formed bis-diazo-imino compound, whose probable formula is:

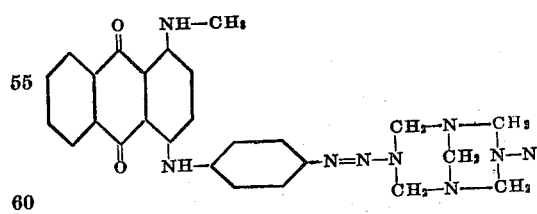 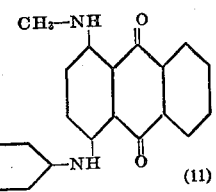

is separated as a cake by filtration, washed well with water, and is retained preferably as an aqueous paste.

A dye bath is prepared by adding 20 grams of the aqueous paste so obtained and containing 4 grams of the above identified bis-diazo-imino compound to 500 cc. of water to which 1 gram of Leukanol is added. The dye bath is diluted to 2000 cc. volume with water. 100 grams of cellulose acetate skeins are then entered into the cold bath and dyed for a half hour, while the temperature is raised to about 80° C., at which stage the skeins are worked for a half hour longer.

The skeins are then rinsed and to effect the cleavage operation they are immersed in an aqueous bath which contains 5% glacial acetic acid and is at room temperature. By the end of an hour's immersion in the acid bath the active coupling diazo has been regenerated on the cellulose acetate skeins, which are then developed in a solution containing 4 grams sodium phenolate whereupon a bright green shade of unusual fastness is obtained. The skeins are finished thereafter in the usual way.

*Example 10.*—The aqueous press cake of the product obtained from 1-amino-4-chlor-anthraquinone as illustrated in above Example 8, and which contains approximately 30% total solids, is diluted with water and Leukanol so as to correspond to the following composition:

| | Per cent |
|---|---|
| Dye, as identified in Example 8 | 20 |
| Leukanol (dry) | 5 |
| Water | 75 |

For 100 grams celanese skeins to be dyed in a developed black exceedingly fast to washing, the procedure is as follows: 30 grams of the dye paste above are diluted with 2000 cc. of water and the skeins entered into the cold solution and worked for about 5 minutes until they are completely wetted. From this stage and in about an hour the temperature of the dye bath is gradually raised to about 80° C., and the skeins are worked in the dye bath at this temperature for a half hour longer, after which time the exhaustion of the dye bath is nearly complete, and a bright orange dyeing is obtained.

The skeins are then rinsed, washed and placed in 2000 cc. of an aqueous solution which is held at about 15° C. to about 20° C. and contains 2 grams per liter sodium nitrite and 12 cc. per liter hydrochloric acid 30° Tw. (about 30% HCl). The skeins are turned in this bath for about a half hour, then they are rinsed in water containing 5 grams of sodium acetate per liter and developed in a bath containing 6 grams of meta-toluene-diamine per liter and worked therein for one hour, while the temperature of the developing bath is raised slowly to about 60° C. After this period of development a full jet black of unusual fastness is obtained.

*Example 11.*—The precipitate of di-(alpha-anthraquinonyl-diazo)-penta-methylene-tetramine, as obtained according to Example 7 in the form of a press cake, contains approximately 20% actual product. 300 parts of this press cake are stirred with 15 parts Leukanol (or similar formaldehyde-naphthalene sulfonic acid water-soluble condensation product) until a thin paste is obtained. To this, about 60 parts of the sodium salt of the toluidide of 2,3-hydroxynaphthoic acid, marketed under the trade name Naphthol AS-D, are added. This amount of toluidide corresponds to about two molecular equivalent thereof for one molecular equivalent of the bis-diazo compound. The paste so obtained is heated to between about 50° and about 60° C., until the Naphthol AS-D sodium salt is dissolved; this solution may be hastened by the addition thereto of 60 parts of the ethyl ether of ethylene glycol. A dispersed paste weighing about 435 parts and containing all the intermediates for the production of the anthraquinone-azo dye is thus obtained.

Instead of the solvent, ethyl ether of ethylene glycol, any other assistant may be added, in particular 60 parts isobutyl sodium sulfate, and the resulting mixture may be evaporated to dryness in any convenient way, e. g., in pans in vacuo, or by means of a single or double drum drier in vacuo. 195 parts of a dry printing composition are thus obtained which may be redispersed with water and thickened to proper consistency.

For example, a suitable printing paste may be made as follows when using the dry product:

10 parts of the dry composition are impasted in 6 parts cellosolve (ethyl ether of ethylene glycol), and 14 parts hot water until a smooth solution-suspension is obtained. At this stage 70 parts of a neutral starch-tragacanth thickener are added containing 2 parts of a 20% neutral sodium chromate or sodium nitrite solution and the whole mixture is worked into a smooth printing paste.

Any textile material is printed in the usual way with this printing paste, the fabrics being dried and after-treated in a hot acid bath which is maintained at 90° C., and comprises 50 grams glacial acetic acid and 20 grams formic acid per liter. In this manner a dark deep-red print is obtained, the dyestuff formed having the following probable constitution:

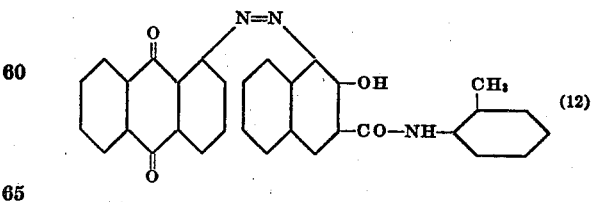
(12)

If in the above example the bis-diazo-imido compound is replaced by the bis-diazo-imido compound which is obtained from diazotized 1-hydroxy-4-(4'-amino-phenylamino)-anthraquinone and hexamethylene-tetramine, the rest of the procedure being unchanged, a blue print is obtained with the ortho-toluidide of 2,3-hydroxynaphthoic acid and a bright green with diaceto-acetyl-ortho-toluidide.

*Example 12.*—40.6 parts of 1-amino-4-(4'-amino-diphenylamino)-anthraquinone are suspended in as finely divided a form as possible in 2000 parts of cold water to which 7.2 parts sodium nitrite are added. The diazotization is effected by adding to this suspension 37 parts glacial acetic acid and is complete after about one hour during which the highly colored greenish-blue suspension changes to a weaker greyish color. To the suspension of diazonium salt 20 to 30 parts hexamethylene-tetramine are added and the mixture is made slightly alkaline with a 10% soda ash solution. After standing for several hours, the mixture loses its active coupling properties and the finely divided grey precipitate therein is then separated as a cake by filtration and is dried in vacuo between about 50° C. and about 60° C. The precipitate has the probable formula:

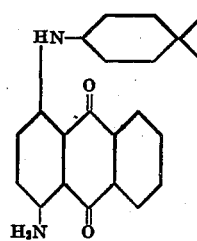 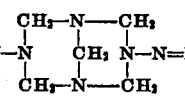 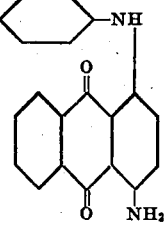
(13)

This compound may be used for dyeing cellulose esters or cellulose ether fibers in the manner illustrated in Example 9. The various shades obtained with this compound are very noteworthy.

While 1-amino-4-(4'-amino-diphenyl-amino)-anthraquinone yields a blue-green shade, the bis-diazo-imido compound derived therefrom loses most of its tinctorial value and dyes such fibers as mentioned above in weak greyish tones of a greenish tint.

If the cleavage is effected with acetic acid or hydrochloric acid in the absence of sodium nitrite, the regenerated diazo, when coupled into 2-hydroxy-3-naphthoic acid, yields a reddish-blue shade. When coupled into the o-toluidide of the above coupling component, grey to blue-black shades are obtained according to concentration.

If the cleavage is effected with hydrochloric acid in the presence of sodium nitrite, the amino group directly attached to the anthraquinone nucleus is diazotized simultaneously and, when the resulting product is coupled into 2-hydroxy-3-naphthoic acid, a bright purple dye which has the following probable formula is obtained.

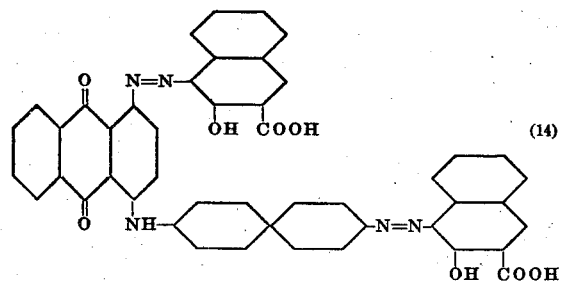
(14)

Other coupling components may be used to produce bluish-green to blue, violet and black tones; coupling components of light molecular weight produce, as a rule, green and blue shades if they are coupled only with the external diazotized amino group to form diazo compounds. The tetrazo dyes derived from the tetrazotized compounds and the same coupling components are reddish-blue to violet dyestuffs.

In the following table additional examples are set forth in terms of the initial base which is diazotized and reacted with hexamethylene-tetramine and the coupling component employed therewith. The shade obtained by application of the diazo-amino compound and the coupling component to textile fibers and development thereon is shown opposite each example.

I claim:
1. In the dyeing of textiles, the improvement which comprises applying thereto an aromatic diazo-imino compound of the following formula,

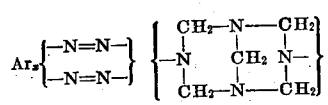

wherein Ar represents an aromatic radical and $x$ represents an integer less than 3, and by means of a coupling component developing the dye on the textile.

2. In the dyeing of cellulose ester or ether textiles, the improvement which comprises applying

| No. | Base | Coupling component | Shade |
|---|---|---|---|
| 13 | 2,5-dichlor-aniline | Diacetoacetyl-o-tolidide | Yellow. |
| 14 | 4-chlor-2-amino-1-methyl-benzene | do | Do. |
| 15 | 4,5-dichlor-2-amino-1-methyl-benzene | do | Do. |
| 16 | 5-nitro-2-amino-1-methyl-benzene | Sodium compound of 4-nitro-2, 5-dimethoxy-1-acetoacetyl-amino-benzene. | Do. |
| 17 | 3-meta-chlor-aniline | 2-hydroxy-naphthalene-3-carboxylic acid-o-tolidide. | Orange. |
| 18 | 4-chlor-2-amino-1-methyl-benzene | 2-hydroxy-naphthalene-3-carboxylic acid-o-phenetidide. | Scarlet. |
| 19 | 2-amino-4-methoxy-5-benzoylamino-1-chlor-benzene. | 2-hydroxy-naphthalene-3-carboxylic acid-o-toluidide. | Violet. |
| 20 | 2,5-dichlor-4-amino-1-methyl-benzene | Sodium compound of 2-hydroxy-naphthalene-3-carboxylic acid-o-anisidide. | Scarlet. |
| 21 | 4-chlor-2-amino-1-methyl-benzene | do | Red. Do. |
| 22 | 4-chlor-2-amino-1-methoxy-benzene | do | Bluish red. |
| 23 | 4-nitro-2-amino-1-methoxy-benzene | Sodium compound of 2-hydroxy-naphthalene-3-carboxylic acid-m-nitranilide. | Bordeaux. |
| 24 | 5-nitro-2-amino-1-methyl-benzene | Sodium compound of 2-hydroxy-naphthalene-3-carboxylic acid-o-toluidide. | Do. |
| 25 | 5-nitro-2-amino-1-methoxy-benzene | Sodium compound of 2-hydroxy-naphthalene-3-carboxylic acid-alpha-naphthylamide. | Do. |
| 26 | 6-amino-4-benzoyl-amino-1,3-dimethoxy-benzene. | 2-hydroxy-naphthalene-3-carboxylic acid-o-toluidide. | Violet. |
| 27 | 6-amino-3-benzoyl-amino-1,4-diethoxy-benzene | Sodium compound of 2-hydroxy-naphthalene-3-carboxylic acid-o-toluidide. | Blue. |
| 28 | 6-amino-3-benzoyl-amino-4-ethoxy-1-methoxy-benzene. | do | Do. |
| 29 | 6-amino-3-benzoyl-amino-1,4-dimethoxy-benzene. | do | Do. |
| 30 | 4-chlor-2-amino-1-methyl-benzene | Sodium compound of 2-hydroxy-carbazole-o-carboxylic acid-2'-toluidide. | Brown. |
| 31 | 4-nitro-4'-amino-2',5'-dimethoxy-azo-benzene | Sodium compound of 2-hydroxy-naphthalene-3-carboxylic acid-o-toluidide. | Black. |
| 32 | 4-chlor-4'-amino-2',5'-diethoxy-azo-benzene | Sodium compound of 2-hydroxy-naphthalene-3-carboxylic acid-alpha-naphthylamide. | Do. |
| 33 | Alpha-amino-anthraquinone | Self shade | Golden orange. |
| 34 | do | Phenyl-methyl-pyrazolone | Golden yellow. |
| 35 | do | Meta-toluene-diamine | Dark-red-brown. |
| 36 | do | Beta-hydroxy-naphthoic acid | Brilliant scarlet. |
| 37 | do | Beta naphthol | Bright orange. |
| 38 | Beta-amino-anthraquinone | Self shade | Yellow. |
| 39 | do | Beta-hydroxy-naphthoic acid | Scarlet. |
| 40 | 1,4-diamino-anthraquinone | Self shade | Reddish-brown. |
| 41 | do | Beta-hydroxy-naphthoic acid | Bluish-scarlet. |
| 42 | do | Meta-toluene diamine | Dark-purplish-brown. |
| 43 | 1-amino-4-hydroxy-anthraquinone | Self shade | Yellowish-olive. |
| 44 | do | Beta-hydroxy-naphthoic acid | Brownish-grey. |
| 45 | do | Meta-toluene-diamine | Golden olive. |
| 46 | 1-amino-5-chlor-anthraquinone | Self shade | Reddish-golden-orange. |
| 47 | do | Beta-hydroxy-naphthoic acid | Full blue scarlet. |
| 48 | do | Meta-toluene-diamine | Full-purplish-red-brown. |
| 49 | 1-amino-4-chlor-anthraquinone | Self shade | Yellowish-golden-orange. |
| 50 | do | Beta-hydroxy-naphthoic acid | Full-yellowish-scarlet. |
| 51 | do | (2 mols) meta-toluene-diamine | Full black. |
| 52 | do | (1 mol) meta-toluene-diamine | Brown. |
| 53 | do | Resorcinol | Golden brown. |
| 54 | 2,6-diamino-anthraquinone | Self shade | Yellow. |
| 55 | do | Beta-hydroxy-naphthoic acid | Full pink. |
| 56 | do | Meta-toluene-diamine | Brownish-purple. |
| 57 | 1-ethylamino-4-amino-anthraquinone | do | Black. |
| 58 | 1-amino-anthraquinone-4-thio-salicylic acid | do | Gold. |
| 59 | 1-amino-2-brom-4-hydroxy-anthraquinone | do | Yellow-brown. |
| 60 | Alpha-alpha'-diamino-dianthraquinonyl | do | Dark reddish-brown. |
| 61 | 1,4-diamino-2,3-dichlor-anthraquinone | do | Medium yellowish-brown. |
| 62 | 1-amino-2,4-dichlor-anthraquinone | do | Dark olive. |
| 63 | 2,6-diamino-benzanthrone | do | Very dark reddish-brown. |
| 64 | 1-amino-4-para-tolyl-amino-anthraquinone | Phenol | Puce. |
| 65 | do | Phenyl methyl pyrazolone | Olive. |
| 66 | 1-amino-4-para-tolyl-amino-anthraquinone | Beta-naphthol | Violet. |
| 67 | 1-amino-4-phenylamino-5-hydroxy-anthraquinone. | Meta-hydroxy-diphenylamine | Bronze-brown. |
| 68 | 1-methyl-amino-4-(para-amino-phenylamino)-anthraquinone. | Phenol | Green. |
| 69 | 1-hydroxy-4-(para-amino-phenylamino)-anthraquinone. | Diacetoacetyl-o-tolidine | Do. |
| 70 | do | 2,3-hydroxy-naphthoic-acid ortho-toluidide | Blue. |
| 71 | 1-amino-4-(para-amino-phenylamino)-anthraquinone. | Beta-naphthol | Black-violet. |
| 72 | do | Beta-hydroxy-naphthoic acid | Reddish-blue. |
| 73 | Para-amino-azo-benzene (base of Color Index No. 15). | Meta-toluene-diamine | Bluish-red. |
| 74 | Para-amino-azo-toluene (Color Index No. 17) | do | Crimson. |
| 75 | 3-nitro-4-methoxy-aniline | Acetoacetic-acid-2-toluidide | Orange-yellow. |
| 76 | 4-nitro-2-amino-1-methylbenzene | Sodium compound of 2,3-hydroxy-naphthoic acid alpha-naphthalide. | Red. | thereto a diazo-imino compound of the following general formula,

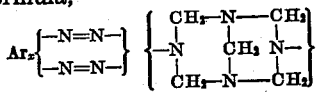

wherein Ar represents an aromatic radical and $x$ represents an integer less than 3, and by means of a coupling component developing the dye on the textile.

3. In the dyeing of cellulose ester textiles, the improvement which comprises applying thereto a diazo-imino compound of the following general formula,

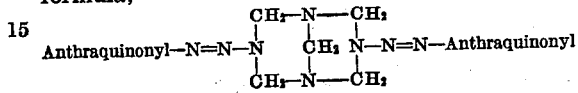

and subjecting the dyestuff on the textile to acid development.

4. In the dyeing of cellulose ester textiles, the improvement which comprises applying thereto the bis-diazo-imino reaction product of an anthraquinonyl-amino-aryl-diazo-compound with hexamethylene-tetramine and subjecting the dyestuff on the textile to acid development.

5. In the dyeing of cellulose ester textiles, the improvement which comprises applying thereto a diazo-imino compound of the following formula,

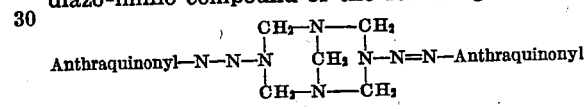

and subjecting the dyestuff upon the textile to acid development in the presence of nitrous acid.

6. In the dyeing of cellulose ester textiles, the improvement which comprises applying thereto the bis-diazo-imino reaction product of an aromatic diazo compound free from sulfo and carboxyl groups with hexamethylene-tetramine, and subjecting the dyestuff on the textile to acid development.

7. A dye powder comprising a coupling component intimately mixed with diazo-imino compound of the following general formula,

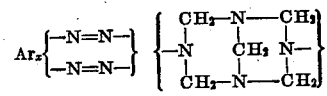

wherein Ar represents an aromatic radical and $x$ represents an integer less than 3.

8. A dye composition comprising a coupling component intimately mixed with a diazo-imino compound of the following general formula,

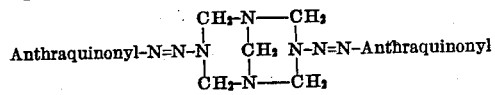

9. A dye composition comprising a coupling component free from sulfo and carboxyl groups intimately mixed with the bis-diazo-imino reaction product of an aromatic diazo compound free from sulfo and carboxyl groups with hexamethylene-tetramine.

10. A dye composition comprising a coupling component intimately mixed with the bis-diazo-imino reaction product of an anthraquinonyl-amino-aryl-diazo-compound with hexamethylene-tetramine.

11. In the dyeing of textiles, the improvement which comprises applying to the textile to be dyed a dye composition comprising a coupling component and a diazo-imino compound of the following general formula,

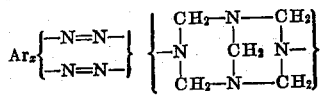

wherein Ar represents an aromatic radical and $x$ represents an integer less than 3, and subjecting the textile to acid treatment to develop the dyestuff thereon.

12. In the dyeing of textiles, the improvement which comprises applying to the textile to be dyed a dye composition comprising a coupling component free from sulfo and carboxyl groups and the bis-diazo-imino reaction product of an aromatic diazo compound free from sulfo and carboxyl groups with hexamethylene-tetramine, and subjecting the textile to acid treatment to develop the dyestuff thereon.

13. In the dyeing of cellulose ester textiles, the improvement which comprises applying thereto an aqueous dispersion of a diazo-imino compound of the following general formula,

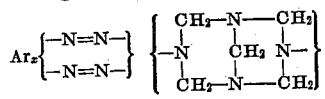

wherein Ar represents an aromatic radical and $x$ represents an integer less than 3.

14. In the dyeing of cellulose ester textiles, the improvement which comprises applying thereto an aqueous dispersion of a diazo-imino compound of the following general formula,

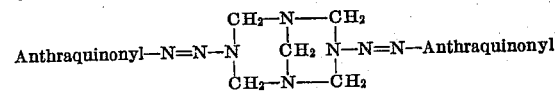

subjecting the cellulose ester textile containing said diazo-imino compound to treatment with acid to generate the corresponding diazonium salt on the textile, and treating the generated diazonium salt on the textile with a coupling component to develop the corresponding azo dye.

15. In the dyeing of cellulose ester textiles, the improvement which comprises applying thereto an aqueous dispersion of the bis-diazo-imino reaction product of an anthraquinonyl-amino-aryl-diazo-compound with hexamethylene-tetramine, subjecting the textile containing said diazo-imino compound to treatment with acid to generate the corresponding anthraquinonyl-diazonium salt on the textile, and treating the generated diazonium salt on the textile with a coupling component to develop the corresponding azo dye.

JEAN G. KERN.